Nov. 22, 1955   H. LOOSLI   2,724,505
APPARATUS FOR PREVENTING INCRUSTATION IN LIQUID CONTAINERS
Filed Feb. 12, 1952   2 Sheets-Sheet 1

2,724,505

APPARATUS FOR PREVENTING INCRUSTATION IN LIQUID CONTAINERS

Hermann Loosli, Zurich, Switzerland

Application February 12, 1952, Serial No. 271,209

Claims priority, application Switzerland December 6, 1951

4 Claims. (Cl. 210—1)

My invention relates to methods and apparatus for preventing or eliminating the formation of fast-adhering coats of precipitates in liquid-containing vessels, particularly the formation of hard scale in water boilers, water conduits and other water containers.

It is known to apply ultrasonic oscillations for combating the formation of hard incrustations, particularly of scale in water containers and water conduits. Experience has shown, however, that a single ultrasonic transmitter is not always sufficient to secure the desired results, and that one or more additional transmitters must be provided for increasing the oscillatory energy imparted to the liquid or its container. While in some cases improved results are obtained with such multiple-transmitter installations, the effects have proved to be erratic and unreliable due to the fact that two or more oscillation transmitters, placed relatively close to each other, may produce oscillatory interferences causing a local weakening or local disappearance of the resultant oscillations.

It is an object of my invention to eliminate such deficiencies and to afford an ultrasonic prevention of scale formation of improved efficacy and reliability regardless of the arrangement or proximity of a number of ultrasonic transmitters used for any particular application.

To this end, and in accordance with my invention, I impart to the liquid at different localities a respective plurality of ultrasonic wave trains, each of limited duration and preferably damped characteristic, and excite these trains of oscillations in an enforced periodic succession. The ultrasonic transmitters for this purpose consist preferably of magnetostrictive devices whose oscillatory member is an inductively excited rod of nickel or of any other suitable magnetostrictive material such as the chromium-nickel-iron alloys known under the trade name Cekas. Piezo-electric ultrasonic transmitters are likewise applicable, for instance, those having an oscillatory body or plate of turmaline, quartz or barium titanate.

The oscillation-producing bodies of the ultrasonic transmitters may be disposed wholly or partly within the liquid container to be protected, or the bodies may be disposed outside the container and be mechanically coupled with the container of the liquid. For instance, the container wall may have a diaphragm-like portion contacted by the liquid and mechanically joined with the ultrasonic transmitter.

Figure 1:
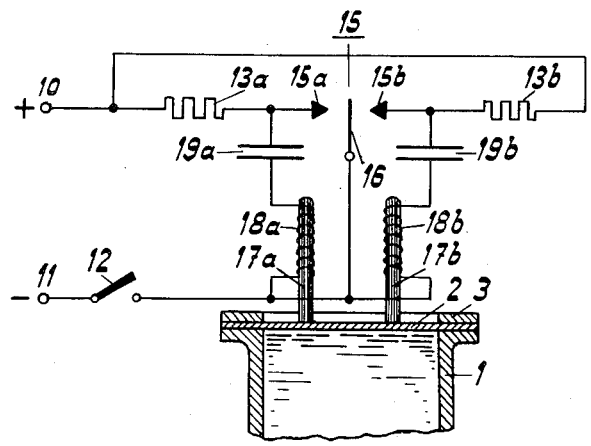
Figure 2:
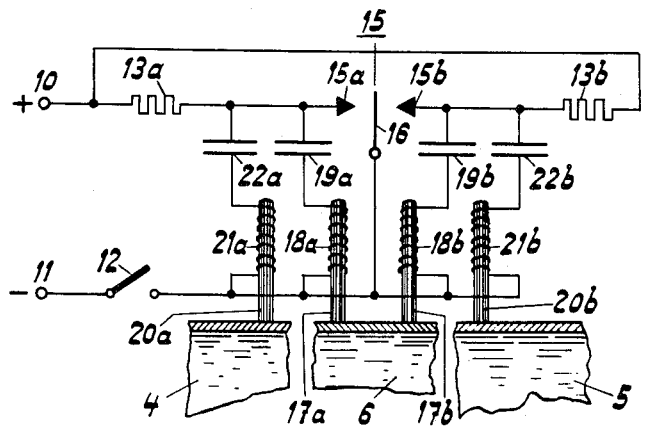
Figure 3:
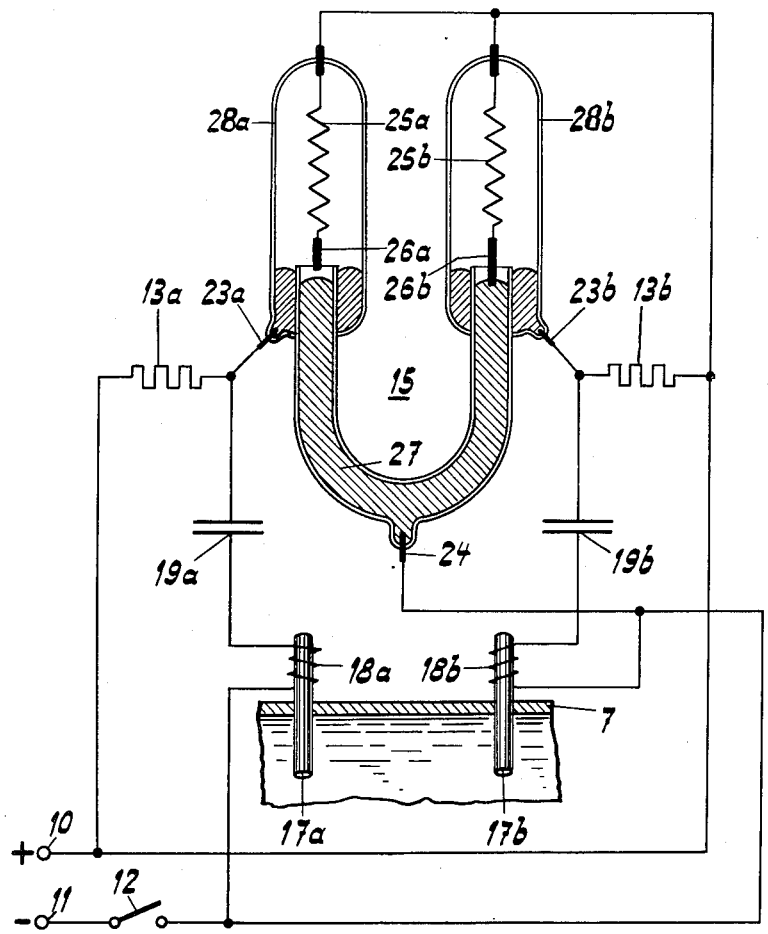

The foregoing and other features of the invention will be apparent from the following description in conjunction with the drawing, in which Figs. 1, 2 and 3 show diagrammatically three respective apparatus according to the invention.

In Fig. 1, the portion of a water-containing vessel is schematically shown at 1. The vessel portion is covered by a diaphragm 2 firmly secured by means of a ring 3 which may be screwed or riveted to the structure 1. Joined with the diaphragm 2 are the oscillatory bodies of two ultrasonic transmitters pertaining to the protective device described presently.

The device has current supply terminals 10 and 11 for connection to a current source, for instance of substantially constant voltage. Connected to terminal 11 is a main switch 12. Two high-ohmic resistors 13a and 13b, each having a resistance magnitude in the order of 20,000 ohms, are connected to the terminal 10. The respective other ends of resistors 13a and 13b are connected with the stationary contacts 15a and 15b of a periodic selector or change-over switch 15 whose movable contact member 16 is connected with the main switch 12. Two ultrasonic transmitters of the magnetostrictive type have their respective oscillator rods 17a and 17b equipped with respective excitation coils 18a and 18b. These coils are connected between switch contact member 16 and the respective switch contacts 15a and 15b through capacitors 19a and 19b respectively. The oscillatory rods 17a and 17b of nickel or other magnetostrictive metal or alloy are mechanically firmly joined with diaphragm 2 so that the oscillatory forces generated in the rods are transmitted to the diaphragm 2 and mechanically imparted to the body of water contacting the diaphragm.

The operation of the device is as follows. When the switch 12 is closed, the direct current voltage of terminals 10 and 11 is applied through the resistors 13a, 13b to the capacitors 19a and 19b so that both capacitors are charged through the respective resistors up to the terminal voltage of the direct current source. When now the movable contact member 16 of the periodic switch 15 is actuated, for instance by thermic, magnetic or mechanical means, the movable switch member 16 alternately engages the stationary contacts 15a and 15b. When contact 15a is engaged, the capacitor 19 discharges through the movable switch member 16 and through the excitation coil 18a, so that the rod 17a is excited to perform ultrasonic oscillations, thus imparting a train of damped oscillatory forces to the container structure and the water contained therein. When thereafter the movable contact member 16 of switch 15 engages the stationary contact 15b, the capacitor 19b discharges through coil 18b and excites the magnetostrictive rod 17b to perform ultrasonic oscillations. In the meantime, the train of oscillations produced in rod 17a has decayed and the capacitor 19a is recharged to the original voltage. Consequently, when the contact member 16 moves back to contact 15a the capacitor 19a is again discharged through the coil 18a, and so forth. Due to the fact that the generation of the trains of ultrasonic pulses is constrainedly controlled to occur successively in the two magnetostrictive rods 17a and 17b, the occurrence of disturbing interferences between the oscillations produced by the two rods is safely prevented. Nevertheless, it has been found that a device thus operating with successive trains of decaying oscillations secures a highly effective prevention of incrustations on the walls of the protected container as well as a more economical operation than can be obtained with continuous ultrasonic oscillations. A frequency in the order of 27,000 C. P. S. has been used successfully, although higher and lower frequencies within the ultrasonic range obtainable by magnetostriction or piezo-electric operation are likewise applicable. When magnetostrictive transmitters are used, the rod-shaped bodies mentioned in the foregoing and hereinafter may be replaced by tubular bodies if needed for securing the desired oscillation frequency.

Instead of providing two oscillatory systems 17a, 18a, 19a, and 17b, 18b, 19b, a larger number of such systems may be used if desired, for instance if an extensive or composite water container and conduit system is to be protected. Such an increase in the number of ultrasonic transmitters may be obtained without substantial changes in the above-described basic design of the protective device. It is merely necessary to provide a periodic selector switch with a correspondingly higher number of sequential stationary contacts. Since the duration of a train of damped ultrasonic pulses may be limited to a few milliseconds, the device may also be operated with alternating current, for instance of the customary frequency of 50 C. P. S., preferably by using a synchronous selector switch.

According to another embodiment of the invention, the above-described method can be carried out by giving the respective trains of pulses different frequencies. To this end the oscillatory systems of the respective ultrasonic transmitters are given a different tuning. For instance, in the embodiment shown in Fig. 1, the magnetostrictive rod 17a may be dimensioned for a frequency of 25,000 C. P. S. and the rod 17b for a frequency of 30,000 C. P. S. The selection of the frequencies may depend upon the requirements of the particular application.

Devices as shown in Fig. 1 may also be used for simultaneously exciting two or more ultrasonic transmitters in any given position of the periodic selector switch 15, provided the simultaneously excited transmitters are spacially remote from each other. Such arrangements may favorably be applied in installations of large size where, for instance, the water conduits and the water boilers, tanks or other vessels must be equipped with separate oscillation generators. Such an arrangement is schematically illustrated in Fig. 2.

The embodiment of Fig. 2 is largely similar to that of Fig. 1, except that additional oscillatory systems 20a, 21a, 22a and 20b, 21b, 22b are electrically parallel-connected to the respective oscillatory systems 17a, 18a 19a and 17b, 18b, 19b. As mentioned, the parallel-operation oscillatory systems, or at least the pertaining magnetostrictive rods and excitation coils, are sufficiently separated in space to avoid disturbing interference between the trains of pulses issuing from the electrically parallel-connected systems. Thus in Fig. 2, the rods 20a and 20b are shown to be mechanically joined with respective conduit structures 4 and 5, while both rods 17a and 17b are joined with one and the same conduit or container structure 6. As explained, the rod 20a and the rod 17a, pertaining to simultaneously excited oscillatory systems that lie electrically parallel to each other, are located at different localities of sufficient spacing to prevent disturbing interference. Similarly, the parallel-operating oscillatory systems to which the rods 17b and 20b belong, are likewise sufficiently spaced from each other to exclude interference.

Well suitable as a periodic control switch for the purposes of the present invention are thermally controlled liquid switches, for instance like the one included in the embodiment of Fig. 3. The circuit diagram of Fig. 3 is largely similar to that of Fig. 1, identical reference characters being used in both figures for respectively similar circuit elements. It will be noted that according to Fig. 3, the rods 17a and 17b of the two oscillators are so joined with the container wall 7 that the rods project directly into the liquid to which the ultrasonic pulses are to be imparted.

According to Fig. 3 the periodic switch 15 has a glass envelope composed of a U-shaped tube 27 and two bulbs 28a and 28b. The tube 27 is substantially filled with mercury and extends upwardly into the bulbs 28a and 28b to form respective annular trap spaces. Two sealed-in electrodes 23a and 23b are contacted by the trapped amounts of mercury. Each bulb 28a, 28b has an electric heater 25a or 25b. The upper ends of the heaters are sealed through the walls of the respective bulbs. The lower terminals 26a and 26b of the heaters terminate near the ends of tube 27. The terminal 26b is sufficiently long to dip into the liquid column of tube 27 when the switch is not in operation, while terminal 26a is shorter and normally out of contact with the liquid column. The spaces above the liquid within the bulbs contain hydrogen or another gas.

When switch 12 is closed, current flows from terminal 10 through the heater 25b, the terminal 26b and the mercury column of tube 27 to electrode 24, switch 12 and terminal 11. The gas in bulb 28b is heated and expands, thus forcing the mercury in tube 27 toward bulb 28a. This interrupts the electric contact between the mercury column and the terminal 26b, so that the heater 25b is deenergized. As the mercury rises toward bulb 28a, it contacts the terminal 26a and overflows into the annular trap space. As a result, the electric circuit is closed between terminals 23a and 24. The energization of heater 25a now has the effect of forcing the mercury back through tube 27 into bulb 28b so that the circuit between electrodes 23a and 24 is again interrupted while the circuit between electrodes 23b and 24 is reclosed. This play repeats itself at the frequency for which the switch 15 is designed.

Each time a circuit between respective electrodes 23a, 23b and electrode 24 is closed, one of the ultrasonic oscillatory systems is excited to issue damped oscillations, while at the same time the capacitor of the other system is charged for subsequent operation in the manner described previously with reference to Fig. 1.

Ultrasonic oscillation transmitters or generators producing damped oscillations during intermittent periods of time have the considerable advantage that they can be rated for smaller power requirements than otherwise needed. During the described performance, the resistors 13a and 13b have the function of limiting the current at the moment when the circuits are closed by the periodic switch. For securing a most forceful effect upon the magnetostrictive body 17a or 17b, it is preferable to tune the self-induction of the pertaining excitation coils 18a and 18b to the capacitance of the respective capacitors 19a and 19b so that the discharge of the capacitor is a maximum. It is, however, not absolutely necessary to tune the frequency of the capacitive discharge circuit to the natural frequency of the magnetostrictive rod 17a or 17b because in most cases a single aperiodic discharge pulse is sufficient for initially exciting the rods to oscillate.

It will be understood by those skilled in the art upon a study of the foregoing disclosure, that the method and apparatus according to my invention may be modified in various respects, in particular as regards the apparatus components to be used, without departing from the essence of the invention and within the scope of the claims annexed hereto.

I claim:

1. Apparatus for combating the formation of hard incrustations in liquid containers, particularly of hard scale in water containers, comprising a plurality of mutually spaced ultrasonic oscillation transmitters adapted for imparting respective trains of damped oscillations to the liquid, an electric energizing circuit having respective capacitors connected with said transmitters and having a periodic selector switch interposed between said capacitors and said transmitters for sequentially discharging said capacitors through said respective transmitters to excite said trains of oscillations in a given sequence.

2. Apparatus for combating the formation of hard incrustations in liquid containers, particularly of hard scale in water containers, comprising two damped ultrasonic oscillation transmitters for imparting respective trains of damped oscillations to the liquid, each of said transmitters having a pair of excitation leads, two current-supply terminals, a periodic change-over switching device having a first switch terminal and two other switch terminals in alternate electric connection with said first terminal, two capacitors connected between said respective other terminals and one of said excitation leads of said respective transmitters, said first switch terminal being connected with one of said current-supply terminals and with said two other excitation leads, and two resistors connecting said other current-supply terminal with said respective other switch terminals, whereby said switching device in either of its periodic conditions causes one of said respective capacitors to discharge through one of said transmitters for exciting said one transmitter while simultaneously causing the other capacitor to be charged through the pertaining resistor.

3. Apparatus according to claim 1, having at least two of said ultrasonic transmitters spacially separated from each other and connected with said switch in electric parallel relation to each other.

4. With a water container structure in combination, an incrustation combating apparatus comprising a plurality of damped ultrasonic oscillation transmitters of respectively different frequencies, said transmitters being spaced from each other and mechanically joined with said container to impart respective trains of ultrasonic oscillations thereto, and electric circuit means having a periodic change-over switch connected with one of said transmitters at a time for successively and separately exciting them to produce said trains of oscillations in a given periodic succession.

References Cited in the file of this patent

UNITED STATES PATENTS

| | | |
|---|---|---|
| 2,071,260 | Holden | Feb. 16, 1937 |
| 2,163,649 | Weaver | June 27, 1939 |
| 2,468,550 | Fruth | Apr. 26, 1949 |
| 2,514,471 | Calhoun | July 11, 1950 |
| 2,650,872 | Goldwasser | Sept. 1, 1953 |

FOREIGN PATENTS

| | | |
|---|---|---|
| 969,803 | France | Dec. 26, 1950 |

OTHER REFERENCES

Beuthe et al.: Abstract, Jour., Am. Water Works Assoc., p. 373, vol. 33, 1941.